United States Patent Office 3,365,063
Patented Jan. 23, 1968

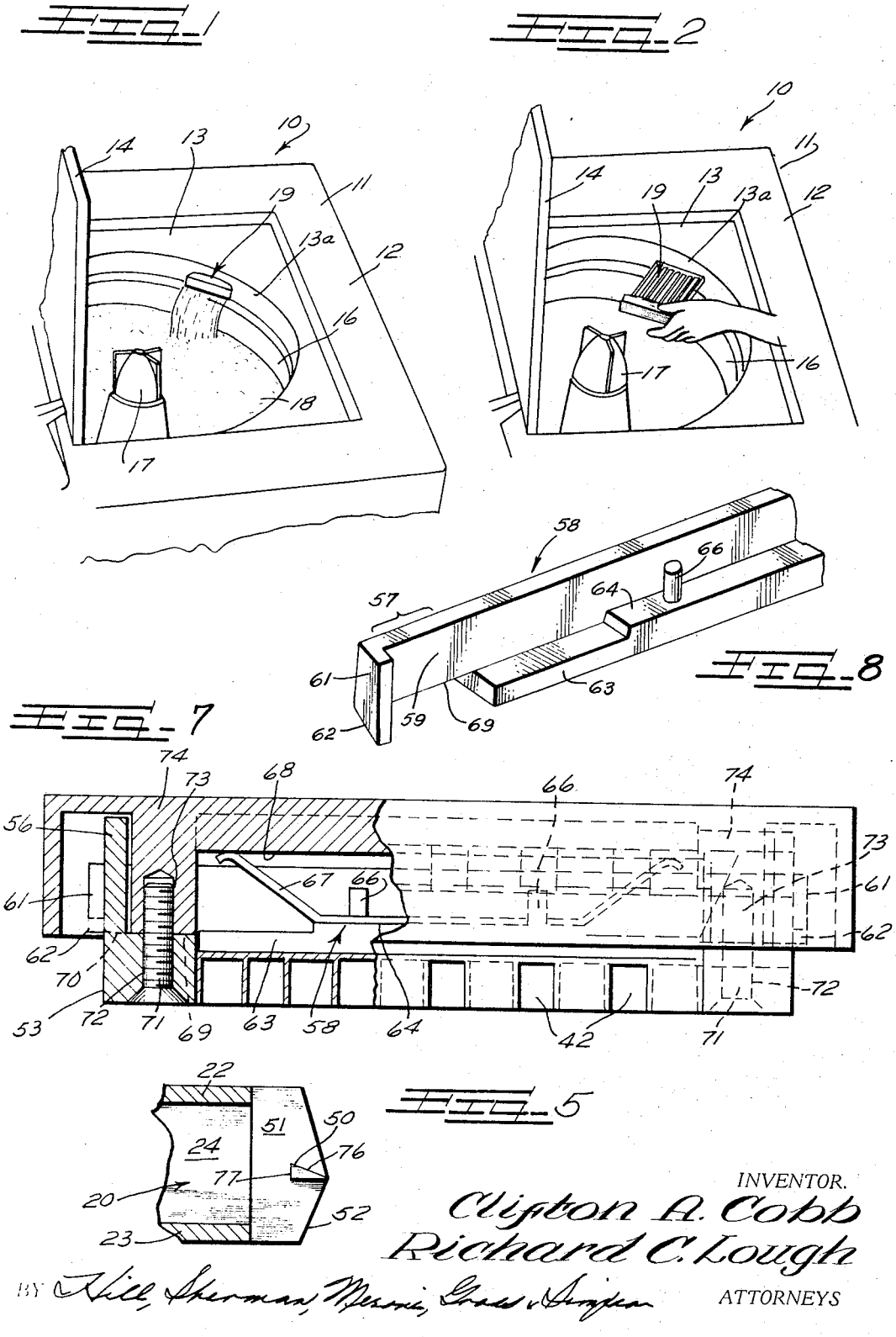

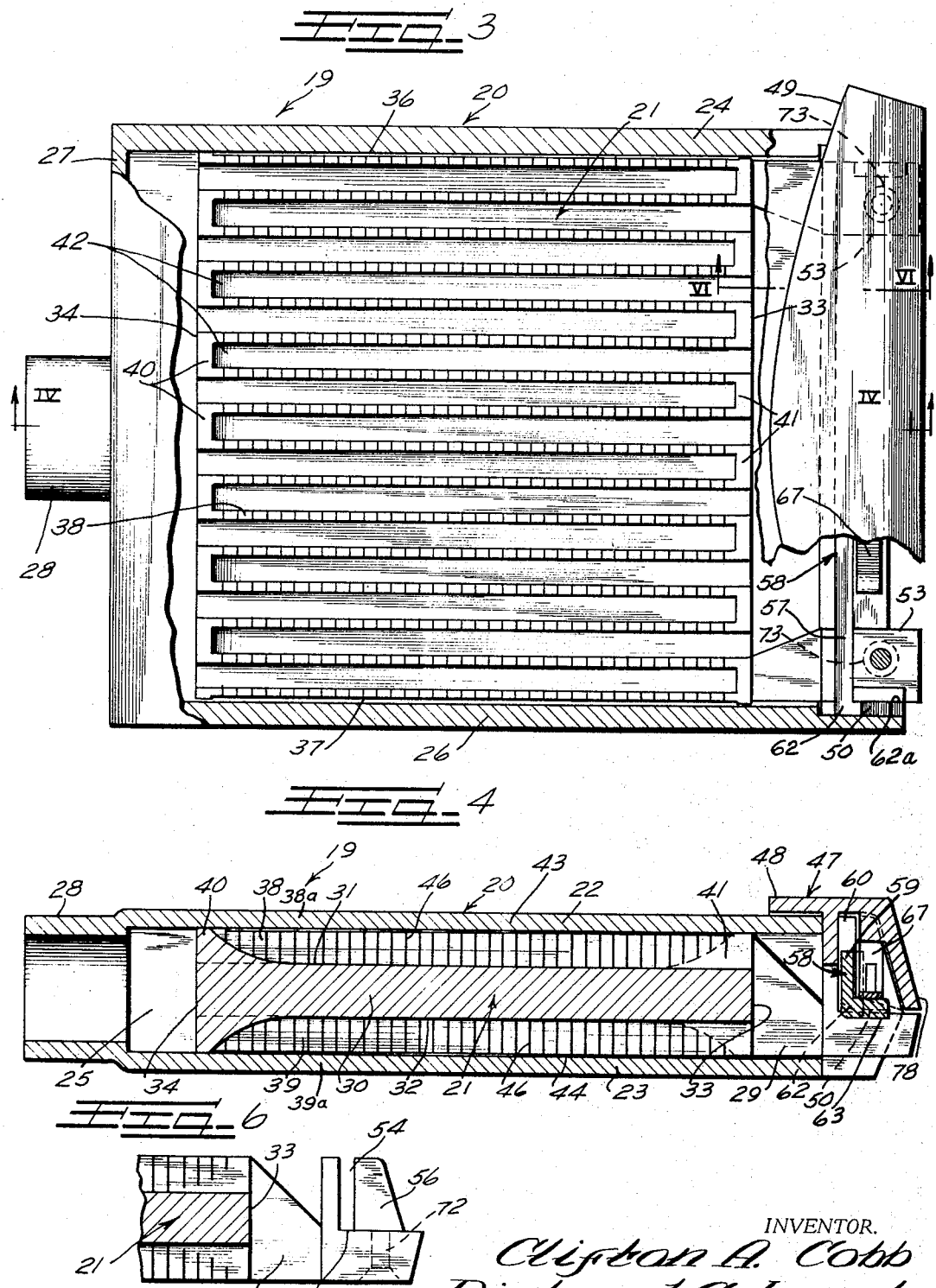

3,365,063
MANUAL FILTER FOR A WASHING MACHINE
Clifton A. Cobb and Richard C. Lough, St. Joseph, Mich., assignors to Whirlpool Corporation, Benton Harbor, Mich., a corporation of Delaware
Filed Sept. 8, 1964, Ser. No. 394,727
2 Claims. (Cl. 210—167)

ABSTRACT OF THE DISCLOSURE

A manually cleanable filter comprising a housing adapted for connection into the hydraulic circuitry of a laundry appliance and a filter cartridge removably insertable into the housing. After laundry liquid or cleaning fluid has entered the filter it is all forced to pass through a plurality of fine grooves in the filter cartridge in which lint and other foreign particles suspended in the fluid are trapped. The filter cartridge can be easily removed and rinsed clean under a water faucet.

---

This invention relates generally to filters and more particularly relates to a manually cleanable fluid filter suitable for use in a cleaning or laundry device such as a washing machine for removing lint and other foreign particles for the laundry liquid or cleaning fluid.

Briefly, the filter of the present invention comprises a housing having a fluid inlet and outlet for connection into the hydraulic circuitry of the laundry device, and a filter cartridge removably insertable into the housing. The filter housing and cartridge are constructed such that the laundry liquid or cleaning fluid which is circulated through the filter must pass through a plurality of fine grooves or interstices formed in the cartridge which serve to remove lint and other foreign particles entrained in the fluid. The interstices of the cartridge are cleanable by merely removing the cartridge from the housing and rinsing it under a water faucet.

The filter of the present invention features an easily actuatable latch mechanism for releasably locking the cartridge in the housing. In addition, the filter is simple in design, inexpensive in manufacture and has a long useful operating life.

It is, therefore, an object of the present invention to provide a simple yet effective filter suitable for use in cleaning or laundry devices such as washing machines for removing lint and other foreign particles entrained in the laundry liquid.

Another object of the present invention is to provide a filter comprising a housing and a filter cartridge insertable into the housing wherein the foreign particles removed by the filter are trapped in the cartridge, the cartridge is removable from the housing for cleaning purposes, and wherein the removed cartridge can be quickly and easily cleaned by merely rinsing or flushing the cartridge under a water faucet.

Still another object of the present invention is to provide a fluid filter incorporating a plurality of fine grooves or interstices for removing foreign particles from the fluid, and wherein the interstices can be easily cleaned manually to enable the filter to be used repeatedly over a long period of time.

A further object of the present invention is to provide a filter which is simple in design, inexpensive in manufacture and which has a long useful operating life.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a fragmentary perspective view of a washing machine incorporating the filter of the present invention;

FIGURE 2 is similar to FIGURE 1 but illustrates the filter cartridge being removed from the filter housing;

FIGURE 3 is a top plan view of the filter having portions thereof cut away to show the relative disposition of parts;

FIGURE 4 is a sectional side view of the filter taken substantially along lines IV—IV of FIGURE 3;

FIGURE 5 is a fragmentary sectional side view of the front or forward end of the housing;

FIGURE 6 is a fragmentary sectional side view of the front or forward end of the cartridge viewed substantially from line VI—VI of FIGURE 3 with a handle portion thereof removed for clarity;

FIGURE 7 is a front elevational view of the filter cartridge with the handle mounted thereon and with portions thereof shown in section; and FIGURE 8 is a fragmentary perspective view of the release bar used in conjunction with the present invention.

As shown in the drawings:

Although the principles of the present invention are of utility in any fluid-filtering application, a particularly useful application is made to cleaning and laundry devices of the home appliance type and an illustrative embodiment is exemplified by an automatic washing machine of the vertical axis type.

Referring to FIGURES 1 and 2 of the drawings, an automatic washing machine incorporating the principles of the present invention is shown generally at reference numeral 10 and comprises generally a cabinet 11 having a top wall 12 recessed as at 13 to accommodate a top closure door 14.

A tub 16 is mounted within the cabinet 11 to provide a washing or treatment zone for combining a load of fabric or other material to be washed or cleaned therein. A vertically extending agitator 17 is situated in the tube for providing a cleaning action to the material confined within the tub.

Also confined within the tub 16 is a quantity of laundry liquid indicated generally at 18 which is agitated along with the material confined within the tub to remove dirt, grit and other foreign particles from the material.

The machine 10 is provided with suitable hydraulic circuitry including a fluid pump for circulating the laundry liquid 18 during a washing cycle from the tub 16, through the hydraulic circuitry, which includes a laundry liquid filter, and then back into the tub.

In accordance with the principles of the present invention a laundry liquid filter 19 is connected in the hydraulic circuitry and is mounted in the cabinet 11. An outlet end of the filter extends through a downturned wall 13a of the cabinet 11 to discharge laundry liquid circulated therethrough back into the tub 16.

Referring to FIGURES 3 and 4, the filter 19 more particularly comprises a housing or casing 20 and a complemental filter cartridge 21 removably insertable into the housing 20.

The housing 20 is generally rectangularly shaped and comprises a pari of spaced parallel top and bottom walls 22 and 23, spaced parallel end walls 24 and 26 and a back wall 27 extending transversely to the top and bottom walls and the side walls to form a chamber 25. A fluid inlet 28 is formed in the back wall 27 for supplying fluid into the interior chamber 25 of the housing 20 and is adapted for connection into the hydraulic circuitry of the washing machine 10. A front portion or outlet 29 of the housing 20 is open to receive the filter cartridge 21 and to discharge the fluid circulated through the filter back into the treatment zone or tub of the washing machine.

As noted, the filter cartridge 21 comprises a rectangularly shaped body member 30 having spaced parallel top and bottom walls 31 and 32, which extend in parallel relation to the top and bottom walls 22 and 23 of the housing 20, front and back walls 33 and 34, which extend in parallel relation to the back wall 27 of the housing 20 and spaced parallel side walls 36 and 37 which extend in parallel relation to the side walls 24 and 26 of the housing.

Formed respectively on the top and bottom walls 31 and 32 of the body member 30 are a plurality of elongated wall members as, for example, at 38 and 39, which extend outwardly away from the body member 30 in spaced parallel relation with respect to one another and to the side walls 24 and 26 of the housing 20, and transversely to the top and bottom walls 22 and 23 of the housing.

Each pair of adjacent wall members, typically shown at 38 and 38a on the top wall 31 of the body members 30 or 39 and 39a on the bottom wall 32 of wall member 30, provides an elongated fluid flow path within the housing 20 from the back wall 34 of the filter cartridge 21 to the front wall 33 thereof. In addition, alternate pairs of adjacent wall members are interconnected at the back wall 34 by means of a plurality of transverse walls 40 and at the front wall 33 by means of a plurality of transverse walls 41.

It will be noted that the wall members 38 and 39 and the transverse walls 40 and 41 serve to form a plurality of elongated flow paths as at 42 which extend in the direction of the central axis of the housing 20 from the back wall 34 to the front wall 33 of the filter cartridge, and which extend across the housing 20 in a direction transverse to the central axis thereof between the side walls 24 and 26. Approximately half of the flow paths 42 are in fluid communication with the inlet 28 of the housing 20, but are not in fluid communication with the open end 29 of the housing, and the remaining group of flow paths 42, which are situated respectively between pairs of flow paths of the first group, are not in fluid communication with the inlet 28 but are in fluid communication with the open end or outlet 29 of the housing.

As illustrated in the drawings, the side walls 36 and 37 of the filter cartridge 21 are situated in closely spaced proximity to the corresponding side walls 24 and 26 of the housing 20, and a distal end or outer extremity as indicated at 43 and 44 of the wall members 38 and 39 is situated in closely spaced proximity to the corresponding top and bottom walls 22 and 23 of the housing 20. As a result, leakage of the laundry liquid around the filter cartridge 21 from the inlet 28 to the opening or outlet 29 is substantially precluded.

In order to provide fluid communication between the inlet 28 and the outlet 29 of the housing, and in order to trap and to remove lint, dirt, grit and other foreign particles entrained in the laundry liquid as it is circulated through the filter 19, the wall members 38 and 39 are provided with a plurality of fine slits or interstices 46 which extend transversely to the longitudinal dimension of the wall members 38 and 39 and transversely to the top and bottom walls 22 and 23 of the housing 20. The interstices 46 provide fluid communication between adjacent flow paths 42 thereby enabling laundry liquid which enters the housing through the inlet 28 to enter that group of flow paths 42 in fluid communication with the inlet 28, then to "cross over" into adjacent flow paths which are in communication with the outlet 29 to be discharged from the housing 20. It will be appreciated that, the interstices 46 are dimensioned sufficiently small such as to trap foreign particles entrained in the laundry liquid as the laundry liquid passes through the interstices.

The filter cartridge 21 is slidably insertable into the housing 20 through the open end 29 thereof, and in order to facilitate insertion and removal of the cartridge from the housing a handle 47 is mounted on the cartridge in spaced relation to the front wall 33 thereof and comprises a top wall 48 which is arcuately shaped as at 49 to overlie a portion of the top wall 22 of the housing 20.

In order to releasably lock the filter cartridge 21 in the housing 20, the handle 47 has incorporated therein a locking mechanism cooperable with a pair of locking nibs formed on the housing 20, and referring to FIGURE 5 it will be noted that a locking nib 50 is formed on an inner surface 51 of each of a pair of projections 52 formed on the side walls 24 and 26 of the housing 20 and extending beyond the open end 29 of the housing.

Referring to FIGURES 3, 6, 7 and 8, a pair of mounting brackets 53, 53 are formed on the cartridge 21 and project longitudinally from the front wall 33 adjacent the side walls 36 and 37 of the cartridge. A groove 54 is formed on a mounting wall 56 of each of the mounting brackets 53 in order to afford reciprocal movement within the brackets of a pair of complementarily shaped neck portions 57 of a latch release bar 58.

The release bar 58 extends substantially across the width of the handle 47 and, as is best illustrated in FIGURE 8, assumes a generally L shape configuration in cross-section. One leg 59 of the bar 58 is confined for reciprocal movement within the grooves 54, 54 of the mounting brackets 53, 53 and within an aligned groove 60 formed in the handle 47. A pair of flanges 61, 61 are formed at both ends of the bar 58 to overlie an outer face 62a of the corresponding mounting walls 56, 56 and have formed thereon a pair of locking nibs 62, 62 shaped complementarily to and cooperable with the locking nibs 50, 50 to engage therewith a locking relation.

Another leg 63 of the latch and release bar 58, which terminates short of mounting brackets 53, comprises a platform 64 having a pair of retaining studs 66, 66 formed thereon to mount a biasing spring 67 thereon.

The spring 67 is confined between a shoulder surface 68 formed interiorly of the handle 47 and serves to constantly bias the release bar 58 away from the shoulder 68 such that a lower surface 69 of the release bar 58 thereof abuttingly engages a bottom wall 70 of the groove 54.

In order to maintain the mounting brackets 53, 53 the handle 47, the release bar 58 and the spring 67 in fixed assembly, a pair of suitable fasteners such as threaded bolts 71, 71 are inserted into a pair of bores 72, 72 formed in the mounting brackets 53, 53 to be received in a pair of complementarily threaded bores 73, 73 formed in a pair of ribs 74 of the handle 47.

When the assembled filter cartridge 21 is inserted into the housing 20, the locking nibs 62, 62 formed on the release bar 58 are biased by the spring 67 to engage and to slide along a ramp defined by an inclined wall 76 formed on each of the nibs 50 and then to drop behind a back wall 77 of each of the locking nibs 50 to maintain the cartridge 21 and the housing 20 in fixed assembly.

Referring to FIGURE 2, it will be appreciated from the illustration that the housing 20 is securely mounted within the cabinet 11 and that the filter cartridge 21 can be easily removed from the outlet 29 of the housing 20 for cleaning purposes. Foreign particles entrained in the laundry liquid which has been trapped and accumulated in the filter cartridge 21 can be quickly and easily removed from the cartridge by merely flushing the cartridge under a water faucet.

Referring again to FIGURE 4, in order to remove the cartridge 21 from the housing 20 it is merely necessary to apply a slight upward force against the leg 63 of the release bar 58, which leg 63 protrudes downwardly below a front wall 78 of the handle 47. Such upward movement of the release bar will disengage the locking nibs 62, 62 thereof from the locking nibs 50, 50 formed on the housing whereupon the cartridge 21 can be removed from the outlet 19 of the housing 20.

Although minor modifications might be suggested by those versed in the art, it should be understood that we wish to embody within the scope of the patent warranted hereon all such modifications as reasonably come within the scope of our contribution to the art.

The embodiments of the invention in which an exclusive property or privilege is claimed are defined as follows:

1. In a laundry machine having a hydraulic circuit for laundry liquid to be recirculated in one direction therethrough,
    a tub having an open top formed by a vertical flange,
    an opening in said flange communicating with said hydraulic circuit and through which recirculating laundry liquid flows directly into the tub,
    a first part mounted in said opening in firm assembly with said flange and comprising means forming an inlet and an outlet in communication with said hydraulic circuit and a chamber communicating said inlet and said outlet,
    a second part inserted in said chamber of said first part through said opening and said outlet in telescoping relation to said first part,
        said first and second parts forming together with one another within said chamber a plurality of longitudinally extending passages having side walls with foramina formed therein,
        each passage being closed at the top and the bottom thereof and open at one end and closed at the opposite end thereof and being constructed so that all of the laundry liquid flowing between said inlet and said outlet and through said chamber must pass through said foramina, and
    means selectively latching said first and second parts together,
        said first part being rigid and comprising a sleeve-shaped member of generally rectangular configuration including upper and lower substantially parallel walls,
        said second part being rigid and comprising a complementarily shaped rectangular member having embossed upper and lower surfaces in which said passages are formed,
        the foraminous side walls of said passages engaging said upper and lower walls of said first part to confine the flow of fluid through said passages and through said foraminous side walls,
        said foramina of said side walls constituting narrow slits extending transversely between the passages.

2. Liquid filter apparatus comprising,
    a generally parallelepiped sleeve-shaped housing defining a liquid transfer chamber having an inlet and an outlet for fluid flow therebetween;
    a filter member removably insertable into said housing through said outlet and including a generally rectangular body core having opposite flat sides;
    a first end positionable adjacent said inlet and a second end positionable adjacent said outlet;
        said rectangular body core further including a pair of elongated wall members respectively connected to and extending outwardly from said opposite sides of said body core and having distal portions in abutting engagement with said housing when said filter member is positioned within said housing;
        each of said elongated wall members being of generally rectangularly, sinuous configuration and including a plurality of spaced, parallel wall portions and a plurality of transverse wall portions connected thereto alternately at said first and second ends of said body core so that said elongated wall members define a pair of interdigitated, parallel flow passageways communicating respectively with said inlet and said outlet;
        each of said parallel wall portions being further provided with a plurality of transverse slits therein to provide a means of fluid-communication between said flow passageways for entrapment of lint and foreign particles carried in liquid flowing into said inlet and out said outlet when said filter element is positioned within said housing.

References Cited

UNITED STATES PATENTS

| | | | |
|---|---|---|---|
| 2,419,155 | 4/1947 | Orton | 210—498 X |
| 2,737,086 | 3/1956 | Dustan | 210—498 |
| 2,936,604 | 5/1960 | Glendening | 210—167 X |
| 3,109,453 | 11/1963 | Lincoln | 210—279 X |
| 3,219,192 | 11/1965 | Trembath et al. | 210—167 X |
| 3,240,345 | 3/1966 | Butler et al. | 210—435 |
| 3,282,427 | 11/1966 | Mandarino et al. | 210—416 X |

FOREIGN PATENTS 105,630   4/1917   Great Britain.

REUBEN FRIEDMAN, *Primary Examiner.*

C. DITLOW, *Assistant Examiner.*